United States Patent
Banerjee et al.

(10) Patent No.: US 10,083,123 B2
(45) Date of Patent: Sep. 25, 2018

(54) PAGE-FAULT LATENCY DIRECTED VIRTUAL MACHINE PERFORMANCE MONITORING

(71) Applicant: VMware, Inc., Palo Alto, CA (US)

(72) Inventors: Ishan Banerjee, Santa Clara, CA (US); Jui-Hao Chiang, Mountain View, CA (US); Kiran Tati, Santa Clara, CA (US); Preeti Agarwal, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/233,337

(22) Filed: Aug. 10, 2016

(65) Prior Publication Data

US 2018/0046581 A1    Feb. 15, 2018

(51) Int. Cl.
*G06F 12/1009* (2016.01)
*G06F 3/06* (2006.01)
*G06F 11/07* (2006.01)
*G06F 9/455* (2018.01)

(52) U.S. Cl.
CPC ......... *G06F 12/1009* (2013.01); *G06F 3/067* (2013.01); *G06F 3/0611* (2013.01); *G06F 3/0653* (2013.01); *G06F 11/073* (2013.01); *G06F 11/079* (2013.01); *G06F 9/45533* (2013.01); *G06F 2212/1024* (2013.01); *G06F 2212/1032* (2013.01); *G06F 2212/152* (2013.01); *G06F 2212/154* (2013.01)

(58) Field of Classification Search
CPC ........ G06F 12/1009; G06F 3/06; G06F 11/07; G06F 3/0611; G06F 3/0653; G06F 3/067; G06F 11/079; G06F 9/45533; G06F 2212/1024; G06F 2212/1032; G06F 2212/154; G06F 2212/152; G06F 11/073
See application file for complete search history.

(56) References Cited

U.S. PATENT DOCUMENTS

| | | | |
|---|---|---|---|
| 9,086,981 B1* | 7/2015 | Tati | G06F 12/10 |
| 2013/0305093 A1* | 11/2013 | Jayachandran | G06F 11/0754 714/37 |
| 2017/0235680 A1* | 8/2017 | Liao | G06F 12/12 711/102 |

OTHER PUBLICATIONS

Waldspurger, Carl A., "Memory Resource Management in VMware ESX Server", In Proc. Fifth Symposium on Operating Systems Design and Implementation (OSDI '02), Dec. 2002, 14 pages.

* cited by examiner

*Primary Examiner* — David X Yi
*Assistant Examiner* — Zubair Ahmed

(57) ABSTRACT

Examples provide a page-fault latency feedback metric to determine performance of workloads or virtual machines (VMs) running on a VM host in a cluster. A hypervisor induces page-faults by varying a memory limit associated with a VM. Page-fault latencies are measured at each of the varying memory limits. A performance loss occurring at each page-fault latency is measured and converted to a performance score. A page-fault translation table is constructed based on the page-fault latencies and assigned performance scores. When a page-fault occurs during execution of a workload on a VM host in the cluster, a cluster manager maps the page-fault latency associated with the page-fault to a performance score in the page-fault translation table. The cluster manager computes a current workload performance or VM performance based on the page-fault latency and the performance score.

20 Claims, 14 Drawing Sheets

PAGE FAULT TRANSLATION TABLE 500

| | PAGE FAULT LATENCY 502 | PERFORMANCE 504 |
|---|---|---|
| ENTRY 1 506 | PFL VALUE 508 | SCORE VALUE 510 |
| ENTRY 2 512 | PFL VALUE 514 | SCORE VALUE 516 |
| ENTRY 3 518 | PFL VALUE 520 | SCORE VALUE 522 |

| | PAGE FAULT LATENCY 502 | PERFORMANCE 504 |
|---|---|---|
| ENTRY 1 506 | PFL VALUE 508 | SCORE VALUE 510 |
| ENTRY 2 512 | PFL VALUE 514 | SCORE VALUE 516 |
| ENTRY 3 518 | PFL VALUE 520 | SCORE VALUE 522 |

PAGE FAULT TRANSLATION TABLE 500

*FIG. 5*

```
PROCEDURE pf2perf   1000
IN:M: VM configured memory size   1002
IN: m: step size for decreasing VM's memsize   1004
OUT: table: array with workload score at specific
page-fault latency   1006
table = NULL; max = M   1008
start VM with (M, max); start workload   1010
do
reset pf-latency   1012
wait   1014
l = read pf-latency   1016
perf = read score   1018
table[l] = perf   1020
max = max – m   1022
set max   1024
wait for stable score   1026
while max > M/4   1028
table = normalize(table)   1030
```

FIG. 10

```
PROCEDURE isPerfLow 1100
IN: T: list of workload-specific pf2perf tables 1102
IN: V : list of VMs on ESX 1104
IN:W: list of workloads in V 1106
IN: PF: list of page-fault latencies for V 1108
IN: TH: limit of loss in workload performance 1110
OUT: TRUE if performance is below desired level, 1112
     FALSE otherwise 1114
sumPctLoss = 0  1116
foreach v € V   1118
pf = PF[v]  1120
w = W[v]  1122
t = T[w]  1124
score = interpolate(t, pf)  1126
pctLoss = (score=t[0]) ? 100  1128
sumPctLos+ = pctLoss  1130
avgPctLoss = sumPctLoss=sizeof(V )  1132
if avgPctLoss < TH  1134
     return TRUE  1136
return FALSE  1138
```

FIG. 11

PROCEDURE balanceHost 1200
IN: H: host to balance 1202
IN: T: list of workload-specific pf2perf tables 1204
IN: TH: limit of loss in workload performance 1206
while TRUE 1208
V = listvms H 1210
W = workload(V) 1212
reset pf-latency 1214
PF = read pf-latency 1216
rebalance = isPerfLow(T; V;W; PF; TH) 1218
if rebalance 1220
v = random(V) 1222
migrate v 1224
Sleep 1226

FIG. 12

PAGE-FAULT LATENCY DIRECTED VIRTUAL MACHINE PERFORMANCE MONITORING

BACKGROUND

In a cluster of virtual machine (VM) hosts, memory is allocated to a VM's address space based on user-configured memory allocation parameters, memory demands from the VM and available memory on the VM host. When a cluster manager places more VMs on a VM host to increase consolidation, the VMs on that host may receive a lesser share of memory, which increases memory pressure on the VM. When a VM host is under memory pressure, memory pages may be reclaimed from one VM and given to another VM having greater priority.

The VM's memory may be reclaimed using a variety of memory reclamation techniques. For example, memory may be reclaimed from VMs using transparent page sharing (TPS), memory compression, memory ballooning and hypervisor-level swapping of memory pages. Memory ballooning requires the active participation of the guest operating system (OS) inside the VM. A balloon driver resides inside the guest OS and reclaims memory pages. These memory reclamation techniques frequently result in decreased performance of one or more workloads running on the VM, depending on the amount of memory reclaimed by each method.

SUMMARY

One example provides a method for determining performance of virtual machines (VMs) based on page-fault latency. A memory limit associated with at least one VM is decreased by a pre-determined memory size increment to reduce an amount of memory available to the at least one VM. The decreased memory limit inducing at least one page-fault. The page-fault latency associated with the at least one page-fault is obtained by a hypervisor. A performance score associated with the at least one VM is calculated based on the page-fault latency. An entry in a page-fault translation table associated with the at least one VM is created. The entry includes the page-fault latency and the performance score.

BRIEF DESCRIPTION OF THE DRAWINGS

FIG. 5 is a block diagram illustrating an exemplary page-fault translation table.

FIG. 10 is an exemplary pseudocode for creating a workload-specific page latency translation table.

FIG. 11 is an exemplary pseudocode for determining whether a performance of a workload on a host is below a threshold.

FIG. 12 is an exemplary pseudocode for host balancing based on a performance score.

Corresponding reference characters indicate corresponding parts throughout the drawings.

DETAILED DESCRIPTION

Figure 1:
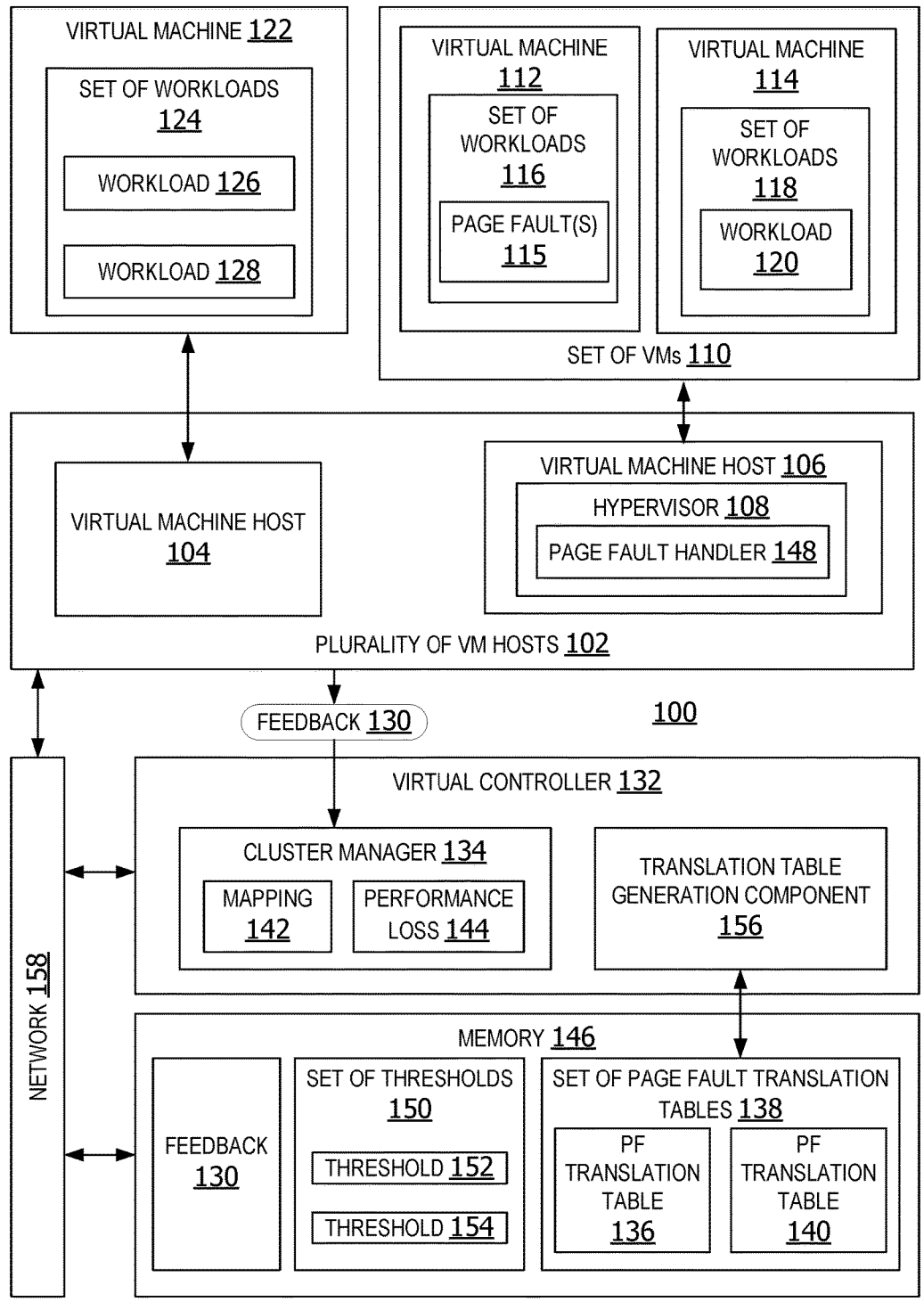
FIG. 1 is a block diagram of a computing system architecture for determining a performance of at least one workload on at least one VM based on page-fault latency.

Examples described herein provide for creating page-fault translation tables for determining performance of at least one workload running on at least one virtual machine (VM). The examples provide a hypervisor level translation table generation component for creating page-fault translation tables. In some examples, a translation table is a workload-specific translation table. In other examples the translation table is a VM-specific page-fault translation tables. A page-fault translation table maps page-fault latencies to performance scores indicating a performance of one or more workloads running on one or more VMs. This enables a cluster manager to determine operational performance of workloads with greater speed and efficiency.

In some examples, the translation table generation component generates a page-fault translation table offline, prior to operation of the cluster manager. This offline generation of the translation tables enables conservation of memory, reduced processor load, reduced network bandwidth usage, and conservation of other system resources while determining performance of workloads and/or VMs during operation of the VM hosts in the cluster.

The cluster manager provided by some examples utilizes at least one page-fault translation table to determine the performance of the at least one workload running on at least one VM in a VM host cluster. The cluster manager utilizes page-latency feedback provided by one or more VM hosts to translate page-fault latencies currently being experienced by one or more VMs to performance scores provided by the page-fault translation tables. This enables improved efficiency in determining workload and/or VM performance. Moreover, the cluster manager is enabled to compute a more accurate and reliable performance level for a workload and/or a VM based on the page-fault translation table(s). This reduces the error rate in performance level determinations.

The cluster manager in some examples utilizes a threshold to determine whether a performance score for one or more workloads running on one or more VMs is within an acceptable performance range. The threshold is a lower performance limit. If the performance score for a VM host falls below the threshold, the cluster manager rebalances the VM host by migrating one or more VMs from the given VM host to a different VM host. This rebalancing enables the cluster manager to improve overall performance of the VM host and the cluster. The rebalancing conserves memory usage by the VMs by migrating VMs to improve memory usage efficiency by the VMs.

In still other examples, a set of page-fault translation tables are provided to a cluster manager 134 to enable the cluster manager to more efficiently assign VMs to VM hosts within a VM host cluster. The page-fault translation tables enable the cluster manager to place VMs on VM hosts such that their workloads produce maximum performance for users while consuming the minimum possible hardware resources, such as CPU and memory resources.

FIG. 1 is a block diagram of a computing system architecture for determining a performance of at least one workload on at least one VM based on page-fault latency. Computing system architecture 100 provides an environment for a plurality of VM hosts 102 supporting at least one VM.

The plurality of VM hosts 102 is a set of two or more servers capable of hosting one or more VMs. As used herein, the term "set" refers to one or more, unless defined otherwise herein.

In this example, the plurality of VM hosts 102 includes VM host 104 and VM host 106. However, in other examples, the plurality of VM hosts 102 includes three or more VM hosts. A VM host may be referred to as a node, a host, a server, a host server, a VM server, a host computing device, or a cluster server.

In other examples, a VM host is implemented as an ESX or ESXi host from VMware, Inc. VMware's ESX Server in some examples is a hypervisor that manages memory and one or more central processing units (CPUs) between powered on VMs on an ESX host.

The VM host combines user-configured allocation parameters along with metrics observed from powered-on VMs to determine the memory to be allocated to each powered on VM. The allocation parameters in some examples includes memory reservation, memory limit and/or memory shares.

A VM host includes underlying hardware components for running VMs associated with a guest operating system. In some non-limiting examples, each host in the plurality of VM hosts is implemented as one or more blade servers within a rack scale architecture (RSA).

Each VM host is capable of serving one or more VMs. In this example, the VM host 106 supports a set of VMs 110, including VM 112 and VM 114. However, in other examples, a VM host may be serving a single VM, three or more VMs, as well as no VMs.

A hypervisor 108, or hypervisor component, is a VM monitor. The hypervisor may also be referred to as a VM manager. The hypervisor 108 provides processor, memory and other hardware resources to VMs running on the host. The hypervisor enables multiple VMs to run on a single host.

In this example, VM host 106 includes hypervisor 108. In other examples, every VM host in the plurality of hosts includes a hypervisor. Likewise, in this non-limiting example, the VM host 104 hosts a single VM. In other examples, the VM host 104 supports multiple VMs.

Each VM runs a set of workloads. A workload is a set of processes in a VM that is monitored or tracked as a unit. In this example, VM 112 runs set of workloads 116. The VM 114 includes set of workloads 118.

A set of workloads 118 includes one or more independent and different workloads. For example, the set of workloads 118 includes a single workload 120. The set of workloads 124 associated with VM 122 includes workload 126 and workload 128. In other examples, a VM may include three or more distinct workloads.

A workload may also include a tiered workload. A tiered workload refers to a workload split up for processing on two or more VMs. In other words, a workload may span multiple VMs rather than being limited to a single VM. For example, a single workload may span both VM 112 and VM 114.

When the cluster manager places excessive VMs and their workloads on a VM host, the VMs may receive less hardware resources, thereby reducing the performance of the workload. If the cluster manager places few workloads on a given VM host, the hardware resources of the host remain under-utilized. Hence, the cluster manger attempts to consolidate VMs on hosts in a cluster in an optimal manner. However, aggressive consolidation of VMs in some examples, may severely affect performance.

Memory pressure on a VM host and resulting memory reclamation from VMs frequently results in performance loss of one or more workloads. The cluster manager in these examples utilizes feedback from one or more VM hosts, one or more VMs, or one or more workloads to determine whether placement of VMs on one or more hosts is adversely affecting performance of the workload. In other words, feedback associated with the VM hosts to the cluster manager about the workload's performance is useful to maintain a desired level of workload performance in the cluster.

Feedback may be obtained from hypervisor-level metrics or from an in-guest agent as guest OS metrics or application-specific metrics. Hypervisor-level metrics such as swap-in rate or swap-out rate are used to determine whether a VM host is experiencing memory pressure. Guest OS metrics such as guest-level swap-in or swap-out rate provide better visibility into the guest OSes memory pressure. Application-level resource management agents installed in the guest OS may provide application-specific performance metrics to the cluster manager.

However, existing feedback metrics that indicate memory pressure on a VM host suffer from shortcomings. For example, the hypervisor-level swap-in/swap-out rate counts the number of VM memory pages that are read from or written into a hypervisor-level swap space. It does not take into account the read or write latency. The disparity between different media backing the swap space may be large. A slow spinning disk may consume several milliseconds to complete a swap operation, while a fast solid-state device (SSD) may consume only a few microseconds. This presents a disparity of as much as three (3) orders of magnitude in the metric. As a result, it frequently becomes difficult for a cluster to correctly interpret this feedback.

The in-guest swap-in/swap-out rate metric suffers from the same difficulty. In addition, obtaining this metric requires the presence of an in-guest software agent that interacts correctly with the guest OS of a VM. It also requires the guest OS to provide the metric correctly.

Moreover, application-level resource management agents may obtain application specific performance metrics that provide feedback to the cluster manager. This requires application-specific software agents. Such an agent might not be available for every application in the VM's workload.

In this example, a hypervisor-level page-fault latency metric is utilized to determine performance of at least one workload associated with at least one VM on a VM host in a cluster. The page-fault latency metric is utilized by the hypervisor as an indicator of performance loss experienced by a guest OS and one or more workloads.

The page-fault latency metric does not rely on a software agent inside the VM. Moreover, the page-fault latency enables the cluster manager to determine performance of a workload without relying on metrics obtained from the guest OS or its applications. The page-fault latency metric is a metric that is applicable to all memory reclamation methods currently available. The page-fault latency metric accounts correctly for varying latencies of media, backing a swap space, and it may be tuned to serve an application-level resource management metric. The page-fault latency metric enables the cluster manager to determine workload and VM performance without relying on swap-in/swap-out rates.

In some examples, the hypervisor 108 generates a page-latency feedback 130. The page-fault latency feedback 130 is feedback regarding an occurrence of one or more page-fault(s) 115 associated with one or more workloads on one or more VMs.

When a VM accesses unmapped or previously reclaimed memory pages, a page-fault is generated. A page-fault handler 148 makes the memory page available and assigns it to the VM's address space. If the memory page-faulted by the VM was never present before in the VM's address space, then it is termed as an unmapped page. If the page was previously reclaimed then it may presently be in a page-shared, compressed or swapped state.

In some examples, the page-fault handler prepares a memory page that is page-faulted by the VM. The time taken to page-fault a memory page differs between existing states of the page. The time taken to page-fault a memory page differs between existing states of the page. For example, page-faulting an unmapped page has the lowest latency, while page-faulting a swapped page has the highest latency.

A VM page-faults memory pages frequently if many of its pages have been reclaimed. Page-faults take time to service and the workload is effectively stalled during that time. This causes the workload to suffer a performance loss. Hence, an increase in memory reclamation results in performance loss for the workload. The magnitude of the loss is typically proportional to the stalled time experienced by the workload. This is directly measureable by the time taken to handle the page-fault by the page-fault handler. In some examples, a measure of the time spent in servicing page-faults for a VM is used as an indicator of the performance loss being experienced by the VM and one or more of its workloads.

The page-fault latency feedback in some examples is a qualitative indicator of the page-fault latency experienced by a VM when it page-faults a memory page into its address space. In this example, the feedback 130 is a page-fault latency for a particular workload 120 on VM 114. However, in other examples, the feedback 130 includes page-fault latency for two or more workloads associated with a given VM or VM host.

A virtual controller 132 receives the feedback 130 from the hypervisor 108. The virtual controller 132 in some examples is a component for managing multiple VM hosts and VMs. The virtual controller 132 in some non-limiting examples, is implemented as a Virtual Center (vCenter) server from VMware, Inc.

The virtual controller 132 includes a cluster manager 134 component. The cluster manager 134 is a component for managing VMs across a cluster of VM hosts. In this non-limiting example, the cluster manager 134 is a cluster-level management software component that maintains performance of workloads in VMs when consolidating those VMs on VM hosts. In some examples, the cluster manager 134 is implemented as VMware's Distributed Resource Scheduler (DSR) or VMware's Distributed Power Management (DPR).

The cluster manager 134 receives the feedback 130 from the hypervisor. The cluster manager 134 translates the page-fault latency feedback 130 into the performance loss being experienced by the VM. In some examples, the calculated performance loss is used as a feedback method to determine an appropriate level of consolidation for a given VM host.

In this example, the cluster manager 134 retrieves a page-fault (PF) translation table 136 corresponding to the workload 120 from the set of one or more page-fault translation tables 138. The set of page-fault translation tables 138 includes one or more PF translation tables. In this example, the set of page-fault translation tables includes PF translation table 136 and PF translation table 140. However, in other examples, the set of page-fault translation tables 138 may include a single PF translation table, as well as three or more PF translation tables.

The PF translation table includes a set of workload specific page-fault latencies and corresponding set of performance scores arranged in value pairs. The value pairs include a workload-specific page-fault latency paired with a corresponding performance score. A performance score is an indicator of a level of performance of a workload associated with a particular page-fault latency level.

A mapping component 142 maps a page-fault latency provided in feedback 130 to a performance score provided by the PF translation table 136. The performance loss 144 component calculates a percentage of performance loss for the workload based on the performance score.

The set of page-fault translation tables 138 in this example is stored in a memory 146. In this non-limiting example, the memory 146 is implemented in physical random access memory (RAM). The memory 146 may be referred to as main memory. The memory 146 in some non-limiting example utilizes server-side dual in-line memory (DIMMs) and/or non-volatile dual in-line memory (NVDIMMs).

A page-fault handler 148 may optionally be called for handling page-faults. A page-fault is a type of interrupt that occurs when a process attempts to access a memory page mapped into virtual address space but not loaded into memory. The page-fault handler 148 is a software component that determines how to handle the page-fault. The page-fault handler 148 optionally includes counters for measuring the page-fault latency of a given VM. The page-fault handler 148 may be associated with a given VM host. In some examples, the page-fault handler 148 is included within a hypervisor, such as hypervisor 108.

In this non-limiting example, the plurality of VM hosts 102 are connected to each other via a network 158. The hosts send and receive data, such as feedback 130, via the network 158. However, the examples are not limited to computing system architectures that include a network. For example, the translation table generation component in some examples generates page-fault translation tables for workloads or VMs while offline in an absence of a network connection.

In some examples, the memory 146 includes a set of thresholds 150. The set of thresholds 150 is a set of one or more thresholds, such as threshold 152 and threshold 154. A threshold may be a user-defined threshold or a default threshold. In some examples, the set of thresholds 150 includes one or more workload-specific performance thresholds. A workload-specific performance threshold defines a lower limit of performance for a particular workload running on a VM.

In other examples, the set of thresholds 150 includes one or more VM specific performance threshold. A VM specific performance threshold defines a lower performance limit for a particular VM.

In still other examples, the set of thresholds 150 includes one or more aggregate thresholds. An aggregate threshold provides a lower limit of aggregate performance for all workloads running on a particular VM. In still other examples, an aggregate VM threshold defines a lower aggregate performance limit for all VMs running on a particular VM host.

In some examples, the cluster manager compares the threshold to the performance score. If the performance score is below the threshold, the cluster manager selects one or more VMs. The selected one or more VMs are migrated to a different host by the cluster manager. The selected VM may be selected at random. If the performance score is above or equal to the performance threshold, no action is taken. In other words, VMs are not migrated away from a VM host until a performance score for a workload or a VM running on the host falls below the lower performance limit threshold.

In other examples, the cluster manager compares an aggregate threshold to an aggregate performance score for two or more workloads or two or more VMs. If the aggregate performance score is below the aggregate threshold, the cluster manager selects one or more VMs and migrates the selected one or more VMs to a different host.

In yet other examples, the cluster manager compares a calculated performance loss to a performance threshold to determine whether performance of a workload, VM, or VM host is performing within an acceptable range or at an acceptable level. If the performance loss value falls below the threshold, the cluster manager determines that the performance of the workload, VM, or host is below acceptable lower performance limits. The cluster manager optionally migrates one or more VMs off the current host and onto a different host. The cluster manager waits a given wait time and then determines whether performance is still below the threshold.

The performance loss of a VM may be compared to a VM threshold. In other examples, a performance loss of a workload is compared to a workload-specific threshold. In yet other examples, an aggregate performance loss for a plurality of workloads or a plurality of VMs is compared to an aggregate performance threshold to determine whether performance of a workload, VM or host is below the performance threshold.

In still other examples, the virtual controller 132 includes a translation table generation component 156. The translation table generation component 156 is a software component for creating a page-fault translation table in the set of page-fault translation tables 138.

The translation table generation component 156 may induce page-faults by varying memory limits of a workload. The translation table generation component 156 measures page-fault latencies experienced by the workload over the varying memory limits. The translation table generation component 156 assigns each measured page-fault latency to a performance score. The translation table generation component 156 empirically constructs a page-fault translation table for the workload based on the measured page-fault latencies and assigned performance score.

In this examples, the translation table generation component 156 generates a page-fault translation table for a workload. In other examples, the translation table generation component 156 generates a page-fault translation table for a particular VM. The translation table generation component 156 induces page-faults in a VM by varying memory limits of a set of workloads on the VM. The translation table generation component 156 obtains the page-fault latencies experienced by the set of workloads over the varying memory limits. The translation table generation component 156 measures a performance of each workload in the set of workloads corresponding to each of the page-fault latencies.

The translation table generation component 156 computes a performance score for the VM based on the performance of the set of workloads corresponding to the induced page-fault latencies. The translation table generation component 156 populates a page-fault translation table for the workload with the page-fault latency values and the performance score values for the VM.

In some example, the page-fault translation table is populated with a plurality of value pairs. Each value pair in the plurality of value pairs includes a page-fault latency at a given memory limit and a corresponding performance score indicating performance of at least one workload at the given page-fault latency.

The cluster manager 134 uses the page-fault translation table obtained from the translation table generation component 156. The cluster manager 134 manages consolidation of VMs on a VM host. The cluster manager 134 may execute different operations on a VM host in a cluster. For example, the cluster manager may migrate a VM into a host, migrate a VM out from a host, and/or monitor a host periodically for performance and execute.

The cluster manager may also use the page-fault latency metric and page-fault translation table(s) to monitor workload performance before migrating a VM into a host, monitor workload performance after migrating a VM into a host, or to improve rebalancing workload performance across multiple VM hosts in a cluster. In other examples, the page-fault latency is used as a feedback metric by the cluster manager for determining performance levels of workloads and/or VMs on a VM host and determine a consolidation level for VMs on a hypervisor. In other words, the page-fault latency feedback is utilized to control the number of VMs on a VM host.

Figure 2:
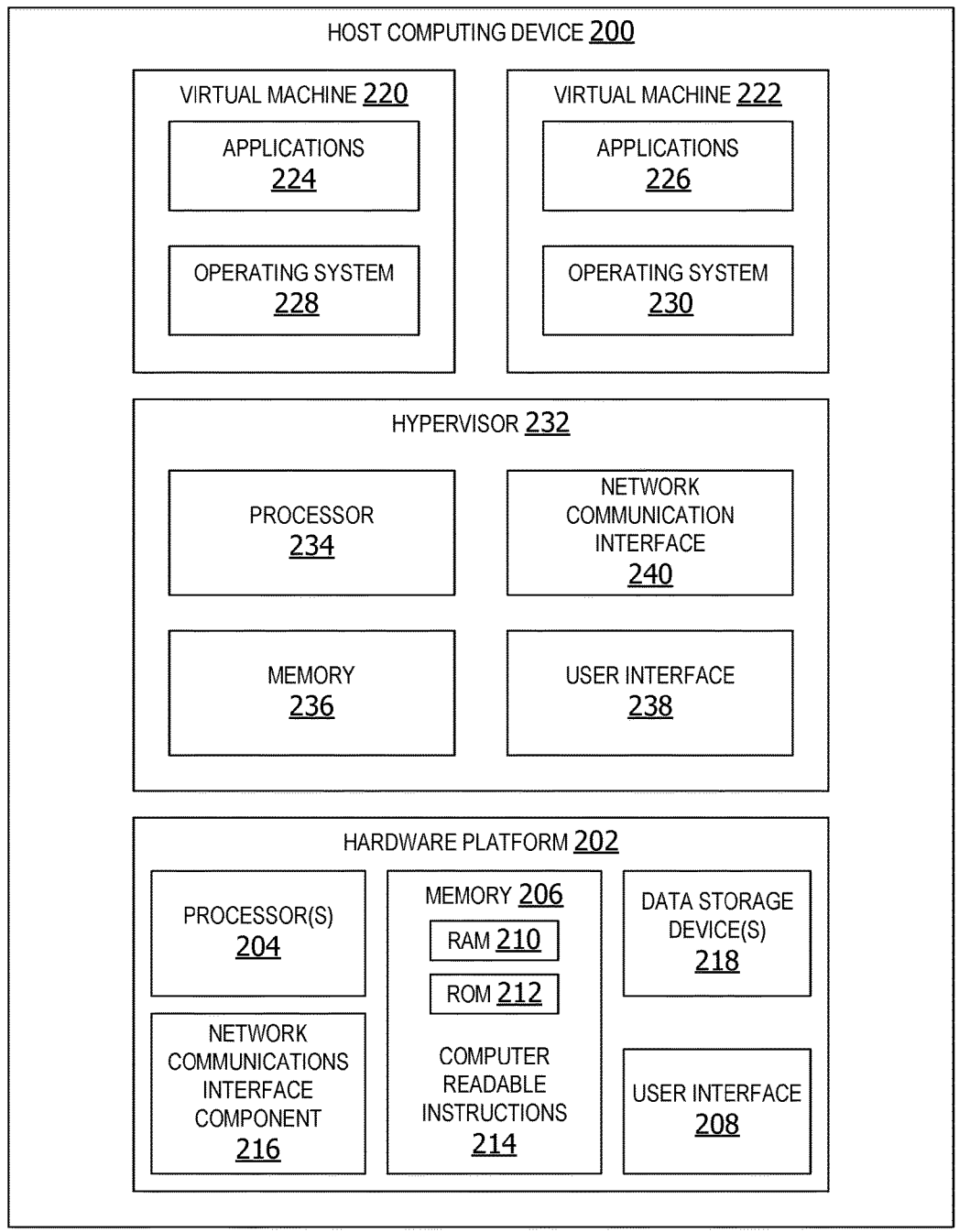
FIG. 2 is a block diagram of a host computing device for serving one or more VMs.

FIG. 2 is a block diagram of a host computing device for serving one or more VMs. The illustrated host computing device 200 may be implemented as any type of host computing device, such as a server. In some non-limiting examples, the host computing device 200 is implemented as a host or ESXi host from VMware, Inc.

The host computing device 200 represents any device executing instructions (e.g., as application(s), operating system, operating system functionality, or both) to implement the operations and functionality associated with the host computing device 200. The host computing device 200 may include desktop personal computers, kiosks, tabletop devices, industrial control devices, wireless charging stations, or server. In some examples, the host computing device 200 is implemented as a blade server within a RSA. Additionally, the host computing device 200 may represent a group of processing units or other computing devices.

The host computing device 200 includes a hardware platform 202. The hardware platform 202, in some examples, includes one or more processor(s) 204, a memory 206, and at least one user interface, such as user interface component 208.

The processor(s) 204 includes any quantity of processing units, and is programmed to execute computer-executable instructions for implementing the examples. The instructions may be performed by the processor or by multiple processors within the host computing device 200, or performed by a processor external to the host computing device 200. In some examples, the one or more processors are programmed to execute instructions such as those illustrated in the figures (e.g., FIG. 6, FIG. 7, FIG. 8, FIG. 9, FIG. 10, FIG. 11, and FIG. 12).

The host computing device 200 further has one or more computer readable media such as the memory 206. The memory 206 includes any quantity of media associated with or accessible by the host computing device 200. The memory 206 may be internal to the host computing device 200, external to the host computing device, or both. In some examples, the memory 206 includes read-only memory (ROM) 210.

The memory 206 further stores a random access memory (RAM) 210. The RAM 210 may be any type of random access memory. In this example, the RAM 210 is part of a shared memory architecture. In some examples, the RAM 210 may optionally include one or more cache(s). The memory 206 further stores one or more computer-executable instructions 214.

The host computing device 200 may optionally include a user interface 208 component. In some examples, the user interface 208 includes a graphics card for displaying data to the user and receiving data from the user. The user interface 208 may also include computer-executable instructions (e.g., a driver) for operating the graphics card. Further, the user interface 208 may include a display (e.g., a touch screen displays or natural user interface) and/or computer-executable instructions (e.g., a driver) for operating the display. The user interface component may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor.

In some examples, the hardware platform 202 optionally includes a network communications interface component 216. The network communications interface component 216 includes a network interface card and/or computer-executable instructions (e.g., a driver) for operating the network interface card. Communication between the host computing device 200 and other devices may occur using any protocol or mechanism over any wired or wireless connection. In some examples, the communications interface is operable with short range communication technologies such as by using near-field communication (NFC) tags.

The data storage device(s) 218 may be implemented as any type of data storage, including, but without limitation, a hard disk, optical disk, a redundant array of independent disks (RAID), a solid state drive (SSD), a flash memory drive, a storage area network (SAN), or any other type of data storage device. The data storage device(s) 218 may include rotational storage, such as a disk. The data storage device(s) 218 may also include non-rotational storage media, such as SSD or flash memory.

In some non-limiting examples, the data storage device(s) 218 provide a shared data store. A shared data store is a data storage accessible by two or more VM hosts in a VM host cluster.

The host computing device 200 hosts one or more VMs, such as VMs 220 and 222. The VM 220 in some examples, includes data such as, but not limited to, one or more application(s) 224. The VM 222 in this example includes applications(s) 226. The application(s), when executed by the processor(s) 204, operate to perform functionality on the host computing device 200. Exemplary application(s) include, without limitation, mail application programs, web browsers, calendar application programs, address book application programs, messaging programs, media applications, location-based services, search programs, and the like. The application(s) may communicate with counterpart applications or services such as web services accessible via a network. For example, the applications may represent downloaded client-side applications that correspond to server-side services executing in a cloud.

In this example, each VM includes a guest operating system (OS). In this example, VM 220 includes guest operating system (OS) 228 and VM 222 includes guest OS 230.

The host computing device 200 further includes one or more computer executable components. Exemplary components include a hypervisor 232. The hypervisor 232 is a VM monitor that creates and runs one or more VMs, such as, but without limitation, VM 220 or VM 222. In one example, the hypervisor 232 is implemented as a vSphere Hypervisor from VMware, Inc.

The host computing device 200 running the hypervisor 232 is a host machine. VM 220 is a guest machine. The hypervisor 232 presents the OS 228 of the VM 220 with a virtual hardware platform. The virtual hardware platform may include, without limitation, virtualized processor 234, memory 236, user interface device 238, and network communication interface 240. The virtual hardware platform, VM(s) and the hypervisor are illustrated and described in more detail in FIG. 16 below.

Figure 3:
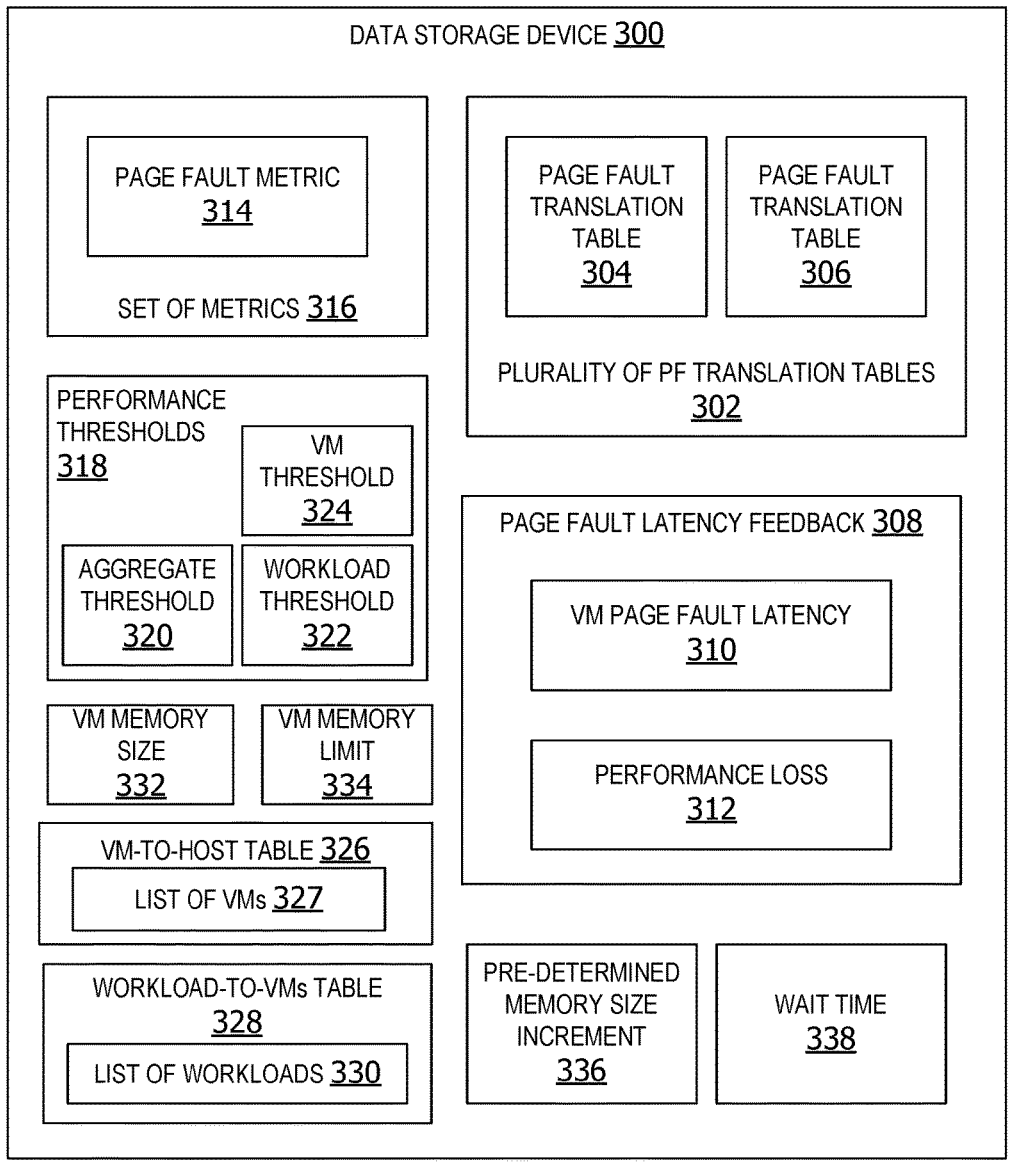
FIG. 3 is a block diagram of a data storage device associated with at least one VM host.

FIG. 3 is a block diagram of a data storage device associated with at least one VM host. The data storage device 300 is a device, such as data storage device(s) 218 in FIG. 2. In this example, the data storage device 300 stores a plurality of page-fault translation tables 302 corresponding to a plurality of workloads. In other words, each PF translation table corresponds to a particular workload on a given VM. In this example, page-fault translation table 304 is associated with a first workload and page-fault translation table 306 corresponds to a different, second workload.

The data storage device 300 may optionally store page-fault latency feedback 308 received from one or more VM hosts. The page-fault latency feedback 308 in some examples is utilized as a page-fault metric 314 to determine workload performance on a VM.

The page-fault latency feedback 308 may include the page-fault latency for one or more workloads on a VM. In this example, the page-fault latency feedback 308 includes a page-fault latency 310 utilized to determine a performance loss 312 of a workload or VM. In other examples, the feedback 308 includes a plurality of page-fault latencies for a plurality of workloads associated with one or more VMs.

In still other examples, the page-fault latency feedback 308 may include different page-fault latencies experienced by a given workload at different times. For example, the page-fault latency 310 may be a PF latency experienced at a first time interval and the page-fault latency may be a PF latency experienced by the same workload at a second time interval.

In some examples, a set of metrics 316, including the page-fault metric 314, is utilized to determine performance of a set of one or more workloads and/or determine a performance of a set of one or more VMs. The metrics are collected on VM hosts and/or by the virtual controller for objects, as well as physical and virtual devices. In some examples, data counters provide metadata for the metrics.

The page-fault metric 314 utilizes the page-fault latency of VMs as feedback from VM hosts to determine if workloads in a VM are affected when VMs are consolidated on a given VM host. In some examples, the page-fault latency is determined by observing counters in the page-fault handlers, such as the page-fault handler 148, without relying on software agents inside the VM, its guest operating system (OS), or the workload. In other examples, the page-fault latency is incorporated into a cluster manager to consolidate VMs on a VM host.

The metrics in these examples is a page-fault metric. However, in other examples additional other metrics are also utilized, such as, but not limited to CPU metrics, disk metrics, memory metrics, network metrics, as well as other metrics. For example, a disk metric may include, without limitation, a disk write latency. A non-limiting example of a network metric may include a percentage of CPU usage.

The data storage device 300 optionally includes one or more performance thresholds 318. The performance thresholds 318 in some examples includes an aggregate threshold 320. The aggregate threshold 320 is a user defined threshold defining a lower performance limit for an aggregate of workloads or an aggregate of VMs.

The performance thresholds 318 in other examples includes a workload threshold 322. The workload threshold 322 is a workload-specific threshold. The performance thresholds 318 in still other examples includes a VM threshold 324. The VM threshold 324 is a lower limit of loss in workload performance applicable to one or more VMs.

A VM-to-host table 326 optionally provides a list of VMs 327 running on each host in the plurality of VM hosts. The list of VMs 327 includes an identification of each VM running on each host.

A workload-to-VM table 328 provides a list of workloads 330 running on each VM. In other words, the workload-to-VMs table 328 identifies the set of workloads running on each VM on a given VM host.

The VM memory size 332 is the memory size configured for a given VM where the page-fault translation table is created. The VM memory limit 334 is a configured memory limit associated with a particular VM. The pre-determined memory size increment 336 is a step size for decreasing a VM's memory size during creation of a page-fault translation table. The wait time 338 is a predetermined period of time. The wait time 338 in some examples is a user defined wait time. In other examples, the wait time 338 is a default wait time.

Figure 4:
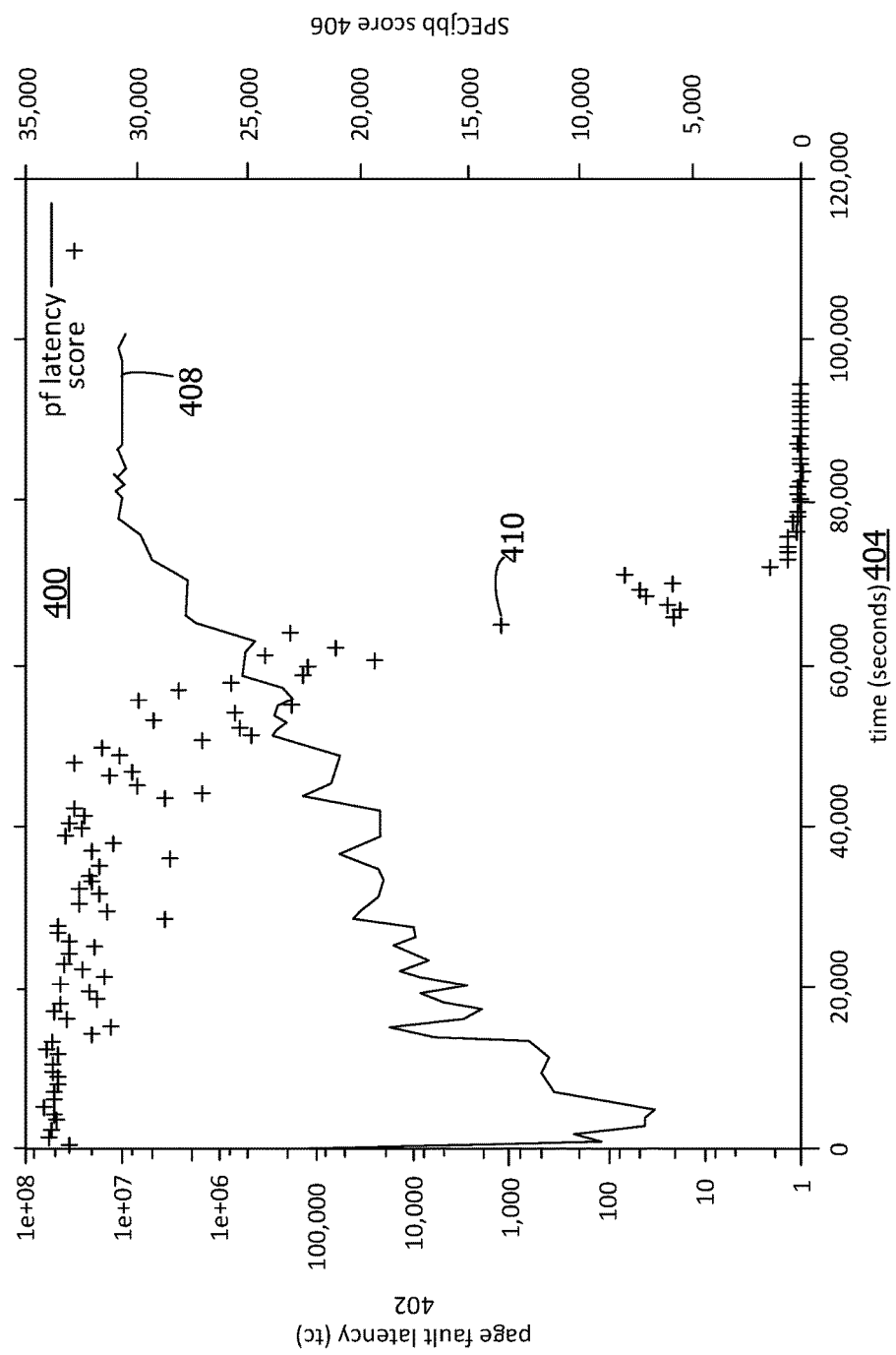
FIG. 4 is a graph illustrating page-fault latencies and performance scores for a workload at varying memory limits.

FIG. 4 is a graph illustrating page-fault latencies and performance scores for a workload at varying memory limits. The graph 400 provides results from an operation where memory pages available to a VM are progressively reduced.

In this example, a workload "SpecJBB" was executed in a VM. The graph 400 illustrates performance of the SpecJBB workload when page-fault experience by the VM progressively increases. The memory limit of the VM is progressively reduced to induce memory pressure and increase page-fault latency. In one non-limiting example, the VM is a LINUX VM.

The left y-axis (log scale) 402 shows page-fault latency. The page-fault latency shows total compute cycles spent by a VM host for servicing page-faults within an interval of 1 second. The user configured memory limit of the VM is progressively reduced over time 404 from the configured memory size of the VM to half its size. The solid line 408 shows the page-fault latency over time.

The x-axis shows time 404 in seconds as the process of reducing the VM memory limit progresses. The right y-axis 406 shows the performance score reported by the SpecJBB workload. A performance score is reported every 900 seconds. The performance scores on the graph are denoted by a "+" 410.

As shown in FIG. 4, an increase in page-fault latency (pf-latency) causes the performance (score) of SpecJBB to decrease. The graph 400 demonstrates a direct correlation between the page-fault latency and the performance of the workload. The graph 400 demonstrates that the page-fault latency may be used as an indicator of the performance being delivered by the workload. Thus, as page-fault latency increases, performance of the workload decreases.

In some examples, a page-fault translation table is constructed for the latency-performance graph. Given a page-fault latency being experienced by the VM or workload, its corresponding performance score is retrieved from the page-fault translation table. In some examples, the page-fault translation table is empirically constructed for a specific workload prior to operation of the cluster manager. In other examples, the page-fault translation table is constructed for a specific VM.

In some examples, if a workload does not have a corresponding page-fault translation table during operation of the cluster manager, the cluster manager consults a page-fault translation table for a similar workload to map the page-fault latency to a corresponding performance score. A similar workload may be any type of workload having performance or page-fault latency values analogous to another workload. Any user-defined criteria may be utilized to determine similarity of workloads.

In other examples, if a VM does not have a corresponding VM-specific page-fault translation table, the cluster manager consults a page-fault translation table for a similar VM to map at least one page-fault latency for the VM to a corresponding performance score of the VM FIG. 5 is a block diagram illustrating an exemplary page-fault translation table. The page-fault translation table 500 in this example is a workload-specific page-fault translation table. Each entry in the page-fault translation table 500 includes a pair of values for the page-fault latency 502 and the performance 504 corresponding to the page-fault latency.

For example, entry 506 includes a page-fault latency (PFL) value 508 and a corresponding performance score value 510. Likewise, entry 512 includes PFL value 514 and performance score value 516. The entry 518 for PFL value 520 identifies the assigned performance score value 522.

Figure 6:
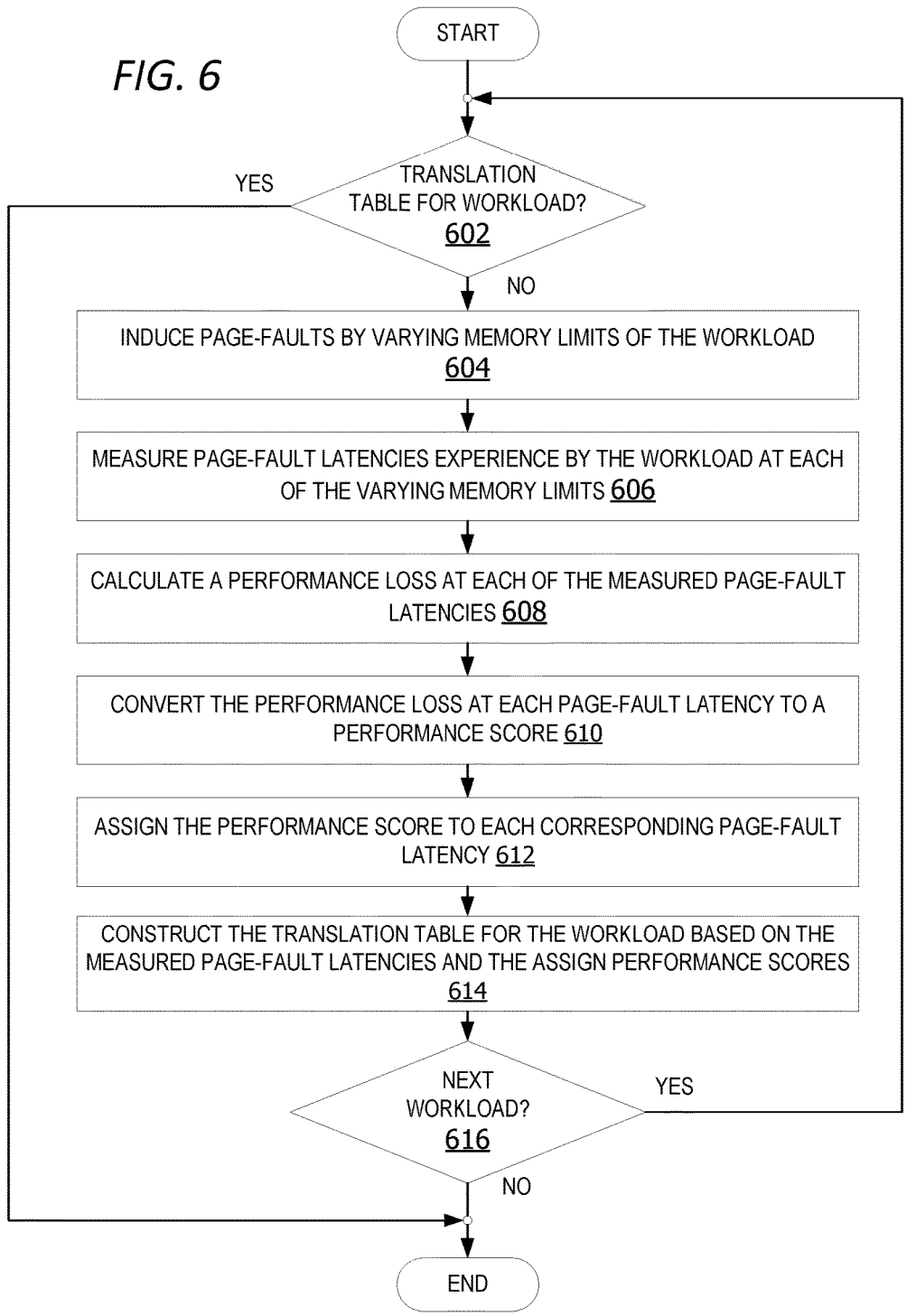
FIG. 6 is a flowchart of a process for generating a workload-specific page-fault translation table.

FIG. 6 is a flowchart of a process for generating a workload-specific page-fault translation table. The process shown in FIG. 6 may be performed by a server or virtual controller, such as, but not limited to, the virtual controller 132 in FIG. 1. Further, execution of the operations illustrated in FIG. 6 is not limited to a virtual controller. One or more computer-readable storage media storing computer-readable instructions may execute to cause at least one processor to implement the operations illustrated in FIG. 6.

A determination is made as to whether a page-fault translation table for a workload is available at 602. If no, page-faults are induced by varying memory limits of the workload associated with a VM at 604. The page-fault latencies experienced by the workload at each of the varying memory limits are measured at 606. A performance loss is calculated at each of the measured page-fault latencies at 608. The performance loss at each page-fault latency is converted to a performance score at 610. The performance score is assigned to each corresponding page-fault latency at 612. The page-fault translation table for the workload is constructed based on the measured page-fault latencies and the assigned performance scores at 614.

A determination is made as to whether a next workload is present at 616. If yes, the process returns to 602. The process iteratively executes steps 602-616 until a next workload is not present at 616. The process terminates thereafter.

While the operations illustrated in FIG. 6 are described as being performed by a host computing device or a server, aspects of the disclosure contemplate that performance of the operations by other entities. For example, a cloud service may perform one or more of the operations.

In some examples, the operations shown in FIG. 6 are executed in an offline environment in an absence of a network. In other examples, the operations shown in FIG. 6 are executed in an online environment.

Figure 7:
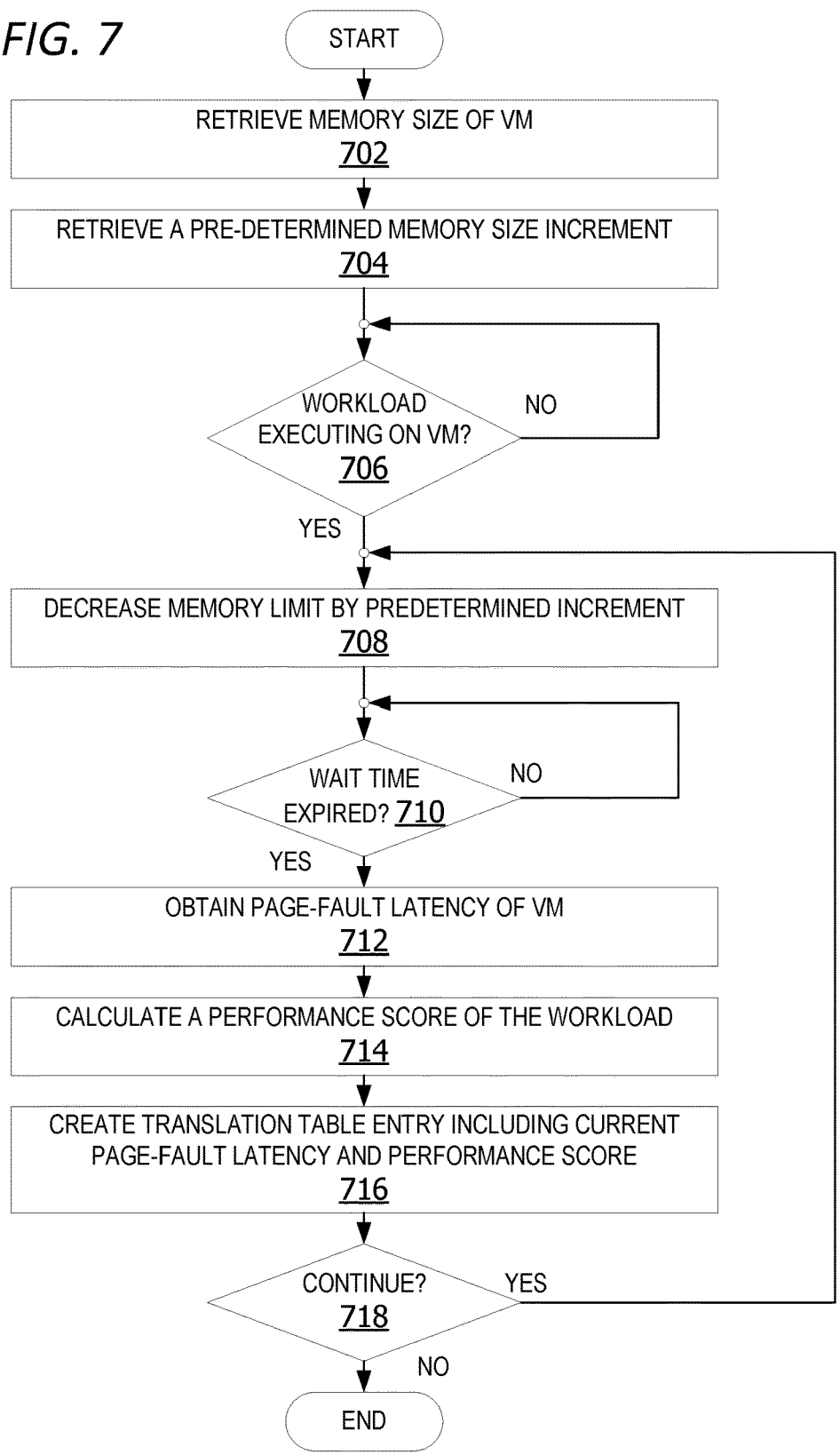
FIG. 7 is a flowchart of a process for creating a page-fault translation table for a workload.

FIG. 7 is a flowchart of a process for creating a page-fault translation table for a workload. The process shown in FIG. 7 may be performed by a server or virtual controller, such as, but not limited to, the virtual controller 132 in FIG. 1. Further, execution of the operations illustrated in FIG. 7 is not limited to a virtual controller. One or more computer-readable storage media storing computer-readable instructions may execute to cause at least one processor to implement the operations illustrated in FIG. 7.

A memory size of a VM is retrieved at 702. A predetermined memory size increment for reducing the memory limit is retrieved at 704. A determination is made as to whether a workload is executing on a VM at 706. If no, the process returns to 706.

If a workload is executing on a VM, the memory limit is decreased by the predetermined increment at 708. The predetermined increment in this example is a step value. A determination is made as to whether a wait time is expired at 710. If no, the process returns to 708. When the wait time is expired, the page-fault latency of the VM is obtained at 712. The performance score of the workload is calculated at 714. The page-fault translation table entry including a current page-fault latency and performance score is created at 716. A determination is made as to whether to continue at 718. If no, the process terminates thereafter.

If the process continues, the operations 708-718 are iteratively executed to obtain page-fault latencies at varying memory limits.

While the operations illustrated in FIG. 7 are described as being performed by a host computing device or a server, aspects of the disclosure contemplate that performance of the operations by other entities. For example, a cloud service may perform one or more of the operations.

Figure 8:
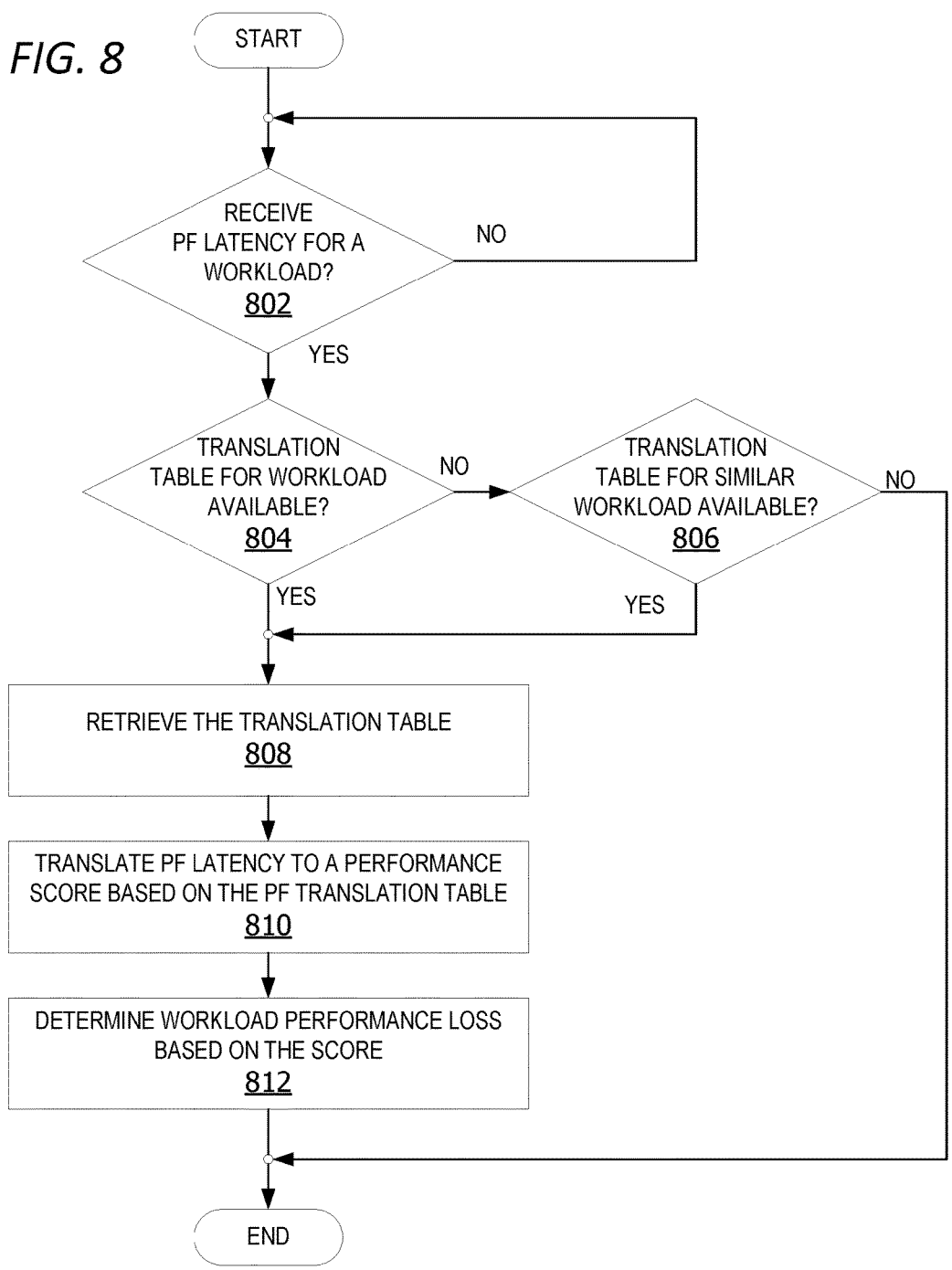
FIG. 8 is a flowchart of a process for determining a workload performance loss based on page-fault latency.

FIG. 8 is a flowchart of a process for determining a workload performance loss based on page-fault latency. The process shown in FIG. 8 may be performed by a server or virtual controller, such as, but not limited to, the virtual controller 132 in FIG. 1. Further, execution of the operations illustrated in FIG. 8 is not limited to a virtual controller. One or more computer-readable storage media storing computer-readable instructions may execute to cause at least one processor to implement the operations illustrated in FIG. 8.

A determination is made as to whether a page-fault latency for a specific workload is received at 802. If yes, a determination is made as to whether the PF translation table for the workload is available at 804. If no, a determination is made as to whether a PF translation table for a similar workload is available at 806. If no, the process terminates thereafter.

If a translation table for the workload is available at 804 or a translation table for a similar workload is available at 806, the PF translation table is retrieved at 808. The PF latency is translated to a performance score based on the PF translation table at 810. The workload performance loss is determined based on the performance score at 812. The process terminates thereafter.

While the operations illustrated in FIG. 8 are described as being performed by a host computing device or a server, aspects of the disclosure contemplate that performance of the operations by other entities. For example, a cloud service may perform one or more of the operations.

Figure 9:
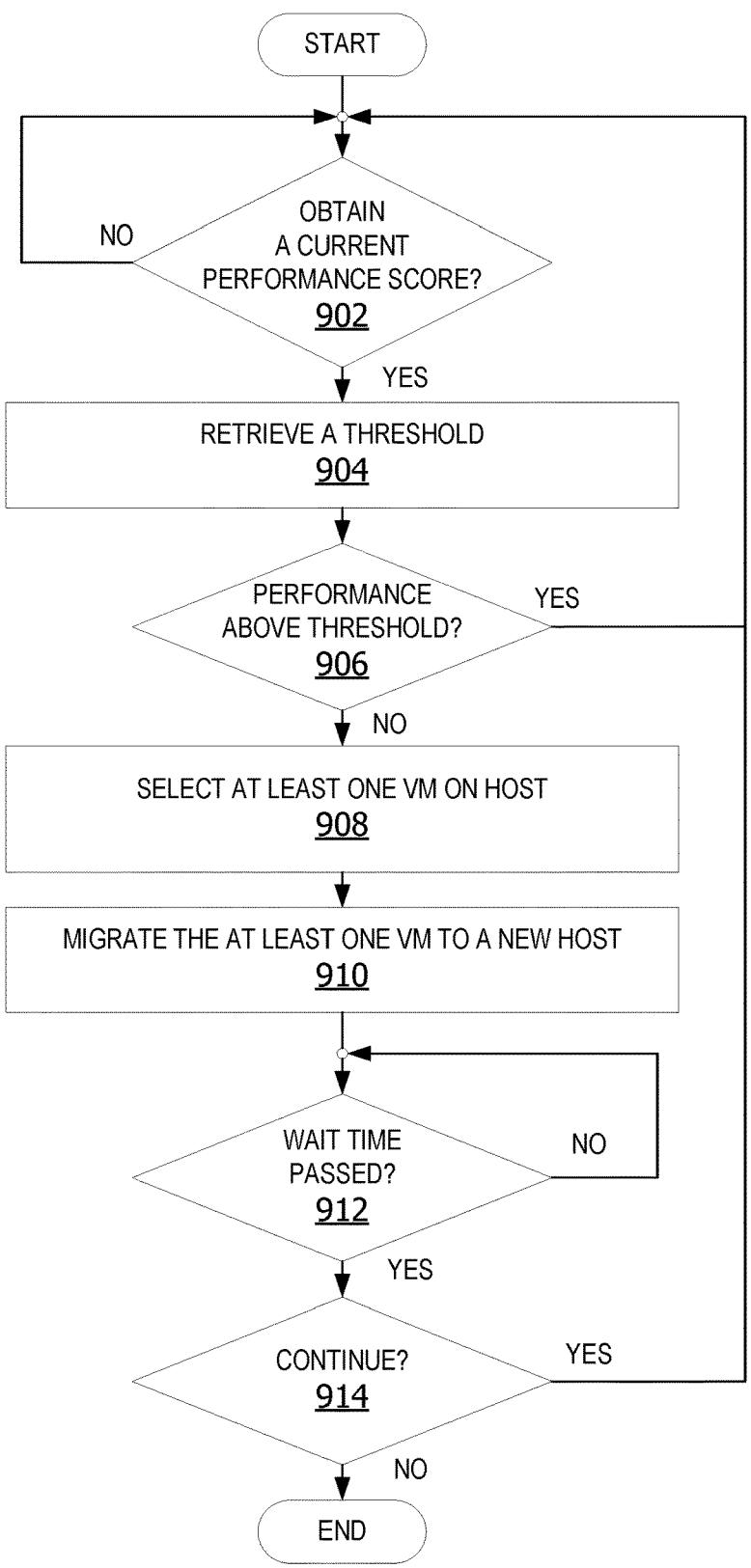
FIG. 9 is a flowchart of a process for migrating a VM based on a performance score and a threshold.

FIG. 9 is a flowchart of a process for migrating a VM based on a performance score and a threshold. The process shown in FIG. 9 may be performed by a server or virtual controller, such as, but not limited to, the virtual controller 132 in FIG. 1. Further, execution of the operations illustrated in FIG. 9 is not limited to a virtual controller. One or more computer-readable storage media storing computer-readable instructions may execute to cause at least one processor to implement the operations illustrated in FIG. 9.

A determination is made as to whether a current performance score is obtained at 902. If yes, a threshold is retrieved at 904. A determination is made as to whether the performance is above the threshold at 906. If no, at least one VM is selected on the host associated with the performance score at 908. The at least one VM is migrated to a new host at 910. A determination is made as to whether a wait time is passed at 912. If yes, a determination is made as to whether to continue at 914. If yes, the process returns to 902. The process iteratively executes 902-914 until a determination is made not to continue at 914. The process terminates thereafter.

While the operations illustrated in FIG. 9 are described as being performed by a host computing device or a server, aspects of the disclosure contemplate that performance of the operations by other entities. For example, a cloud service may perform one or more of the operations.

FIG. 10 is an exemplary pseudocode for creating a workload-specific page latency translation table. The translation table generation component performs the procedure "pf2perf" 1000 to translate page-fault latency into workload performance. The procedure 1000 is executed for a specific workload on a VM with a specific memory size 1002 in this example.

In some examples, the translation table generation component empirically creates a workload-specific lookup table referred to as a page-fault translation table. The page-fault translation table maps a workload-specific performance score to the page-fault latency being experienced by the VM. In other words, the translation table generation component creates one page-fault table for one workload in this example.

The translation table generation component decreases the memory limit for the VM from its initial value to one-fourth (¼) of the initial value. This progressive decrease induces memory pressure on the VM and its workload, thereby inducing memory reclamation. Changing the memory size of the VM affects the characterization of the workload. Thus, in other examples, the procedure 1000 may be executed with different hardware configuration of the VM to obtain an accurate characterization of the workload.

In this example, translation table generation component receives the memory size "M" of the VM where the page-fault translation table will be created as input at 1002. The translation table generation component also takes as input a pre-determined memory size increment "m" for reducing the configured memory limit of the VM 1004. The translation table generation component outputs a page-fault translation table 1006. The output page-fault translation table is an array with a workload performance score for each specific page-fault latency at a variety of differing memory limits.

The memory limit "max" is initialized at 1008. The VM starts with the configured memory size and the memory limit and the workload starts running on the VM at 1010. The translation table generation component obtains the time spent by the VM in handling page-faults in a unit of time at 1012, 1014 and 1016. The translation table generation component obtains the performance score of the workload at 1018. The translation table generation component creates an entry in the output table relating the page-fault latency to its corresponding performance score at 1020.

The translation table generation component decreases the memory limit of the VM at 1022 and 1024. The translation table generation component waits until the workload reacts and stabilizes owing to the change in the memory limit at 1026.

The translation table generation component iteratively executes 1012-1028 to produce a page-fault translation table whose index is the page-fault latency. The translation table generation component creating the page-fault translation table in some examples cannot predict the value of the page-fault latency. Therefore, the index of the table may not be well defined numbers. The translation table generation component optionally executes a normalize subroutine at 1030. The translation table generation component normalizes the array with interpolated data, such that its index is placed on well-defined numbers.

FIG. 11 is an exemplary pseudocode for determining whether a performance of a workload on a host is below a threshold. The cluster manager executes procedure "isPerfLow" 1100 to determine whether the performance of workloads on a VM host is more than a user-configured lower bound.

The cluster manager accepts as input a set of page-fault translation tables "T" at 1102. In some examples, the set of page-fault translation tables are computed off-line.

A list of VMs "V" currently running on a VM host "ESX" is received as input at 1104. A list of workloads "W" running on a VM is retrieved as input at line 1106. The cluster manager receives a list of page-fault latencies "PF" being experienced by the set of VMs "V" at line 1108. A threshold "TH" is received as input at 1110. The threshold is a threshold limit on the loss in workload performance. In some examples, the threshold is a user-configured lower limit of performance.

The cluster manager determines if the overall performance of the workloads on the host is below the lower limit performance threshold. If performance is below the threshold, TRUE is returned at 1112. If performance is above the threshold, then FALSE is returned at 1114. The cluster manager iteratively executes operations 1116-1130 for each VM in the set of VMs, as shown at 1118.

The cluster manager obtains the page-fault latency of a VM at 1120. The workload of the VM is identified at 1122. The page-fault translation table for the workload is identified at 1124. The cluster manager translates the observed page-fault latency of the VM into a performance score from the translation table.

In some examples, the page-fault translation table does not contain an entry for the exact value of "pf". The cluster manager may optionally perform an interpolation procedure at 1126. In these examples, the cluster manager applies an interpolation function on the table "t" to estimate the value of the performance score at "pf." The cluster manager compares the performance score with the best possible score at page-fault latency zero (0) of the workload to compute the percentage of performance loss being experienced by the workload "w" on the VM "v" at 1128. This is stored in "sumPctLoss" at 1130.

The average performance loss across all VMs on the VM host is computed at 1132. If the average performance loss is below a user-configured threshold at line 1134, the procedure returns TRUE at 1136. If the average performance loss is above the threshold, the procedure returns FALSE at 1138.

In some examples, the cluster manager determines the average performance loss across all VMs. The cluster manager determines whether the overall performance on the host is below an aggregate VM threshold. In some examples, if the overall performance is below the threshold, the cluster manager migrates one or more VMs from the host to a different host to reduce the memory pressure on an overloaded VM host.

In still other examples, the cluster manager determines the maximum performance loss on a workload instead of determining the average performance loss. In these examples, the cluster manager determines whether the maximum performance loss of the workload is above a workload-specific threshold.

Thus, the cluster manager determines whether the performance of one or more workloads on a given VM host falls below a user-configured threshold. The cluster manager utilizes workload-specific page-fault translation tables to translate observed page-fault latency feedback received from one or more VMs on the given VM host into a pre-calculated performance score for the one or more workloads.

FIG. 12 is an exemplary pseudocode for host balancing based on a performance score. The procedure "balanceHost" 1200 shows one possible operation of the cluster manager. In this operation, the cluster manager observes the performance of workloads on a host of the cluster. If the performance is below a user-configured threshold, one or more VMs are selected at random from the host and migrated to another host.

The target host "H" to be balanced is received as input at 1202. A list of workload-specific page-fault translation tables are retrieved at 1204. In this example, the page-fault translation tables are computed offline. A user-defined threshold limit of loss for workload performance is received as input at 1206. The operations shown in 1210-1224 are executed iteratively until the VM host is balances at 1208.

The list of powered-on VMs on the VM host "H" is retrieved from the host at 1210. The list of workloads for each VM on the VM host is retrieved at 1212. The page-fault latency experienced by each VM is observed and retrieved at 1214 and 1216.

The cluster manager consumes the observations and determines whether workloads on the VM host are performing below the threshold at 1218. If the performance is below the threshold at 1220, one or more VMs are randomly chosen from the list of VMs residing on the VM host at 1222. The one or more chosen VMs are migrated to another VM host in the same cluster at 1224. Removal of the VMs makes more memory available to the remaining VMs on the VM host "H". The cluster manager waits for some predetermined period of time at 1226. After the wait time is passed, the cluster manager evaluates the performance of the workloads again at 1208.

Thus, in this example, page-fault latency is used to guide consolidation of VMs on a VM host. As shown in FIG. 12, the cluster manager balances VMs on a given VM host to improve performance of workloads on the given VM host. In this manner, the cluster manager maintains performance of one or more workloads at a desired level based on observed page-fault latency feedback received from VMs on the given VM host.

Figure 13:
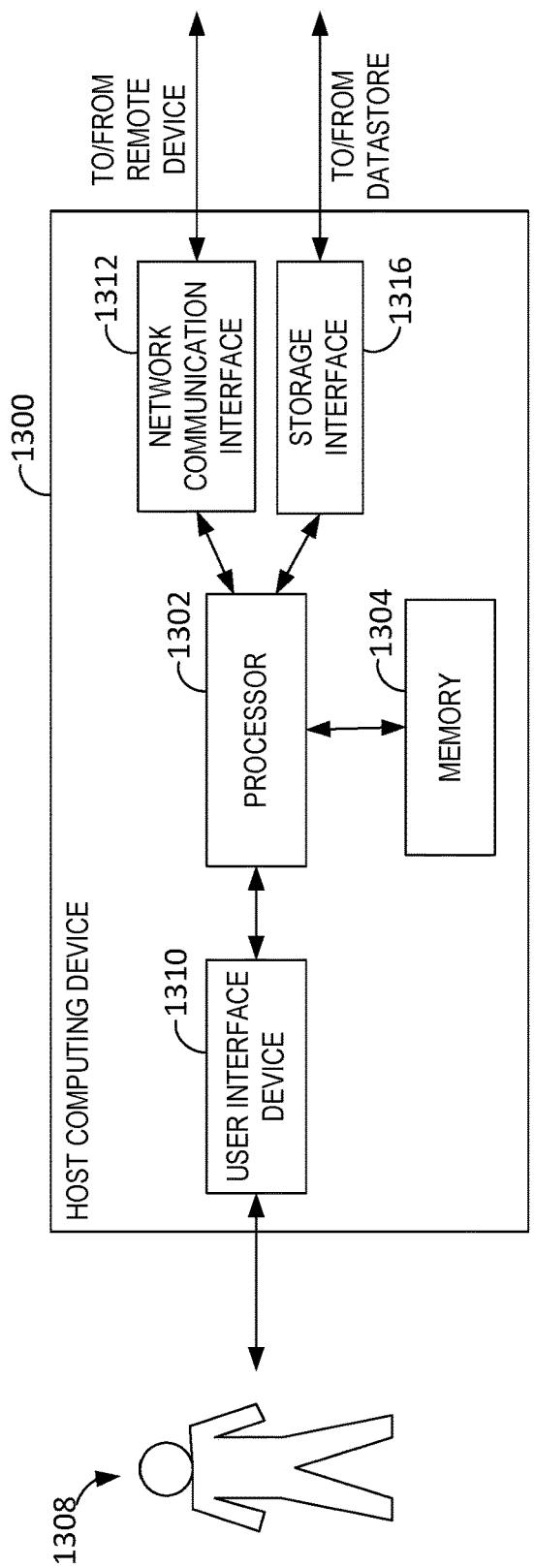
FIG. 13 is a block diagram of an exemplary host computing device.

FIG. 13 is a block diagram of an example host computing device. A host computing device 1300 includes a processor 1302 for executing instructions. In some examples, executable instructions are stored in a memory 1304. The memory 1304 is any device allowing information, such as executable instructions, to be stored and retrieved. For example, the memory 1304 may include one or more random access memory (RAM) modules, flash memory modules, hard disks, solid state disks, and/or optical disks.

The host computing device 1300 may include a user interface device 1310 for receiving data from a user 1308 and/or for presenting data to user 1308. The user 1308 may interact indirectly with host computing device 1300 via another computing device such as VMware's vCenter Server or other management device. The user interface device 1310 may include, for example, a keyboard, a pointing device, a mouse, a stylus, a touch sensitive panel (e.g., a touch pad or a touch screen), a gyroscope, an accelerometer, a position detector, and/or an audio input device.

In some examples, the user interface device 1310 operates to receive data from user 1308, while another device (e.g., a presentation device) operates to present data to user 1308. In other examples, the user interface device 1310 has a single component, such as a touch screen, that functions to both output data to user 1308 and receive data from the user 1308. In such examples, the user interface device 1310 operates as a presentation device for presenting information to the user 1308. In such examples, the user interface device 1310 represents any component capable of conveying information to user 1308. For example, the user interface device 1310 may include, without limitation, a display device (e.g., a liquid crystal display (LCD), organic light emitting diode (OLED) display, or "electronic ink" display) and/or an audio output device (e.g., a speaker or headphones). In some examples, the user interface device 1310 includes an output adapter, such as a video adapter and/or an audio adapter. An output adapter is operatively coupled to the processor 1302 and configured to be operatively coupled to an output device, such as a display device or an audio output device.

The host computing device 1300 also includes a network communication interface 1312, which enables the host computing device 1300 to communicate with a remote device (e.g., another computing device) via a communication medium, such as a wired or wireless packet network. For example, the host computing device 1300 may transmit and/or receive data via the network communication interface 1312. The user interface device 1310 and/or the network communication interface 1312 may be referred to collectively as an input interface and may be configured to receive information from the user 1308.

The host computing device 1300 further includes a storage interface 1316 that enables the host computing device 1300 to communicate with one or more data stores, which store virtual disk images, software applications, and/or any other data suitable for use with the methods described herein. In example examples, the storage interface 1316 couples the host computing device 1300 to a storage area network (SAN) (e.g., a Fibre Channel network) and/or to a network-attached storage (NAS) system (e.g., via a packet network). The storage interface 1316 may be integrated with network communication interface 1312.

Figure 14:
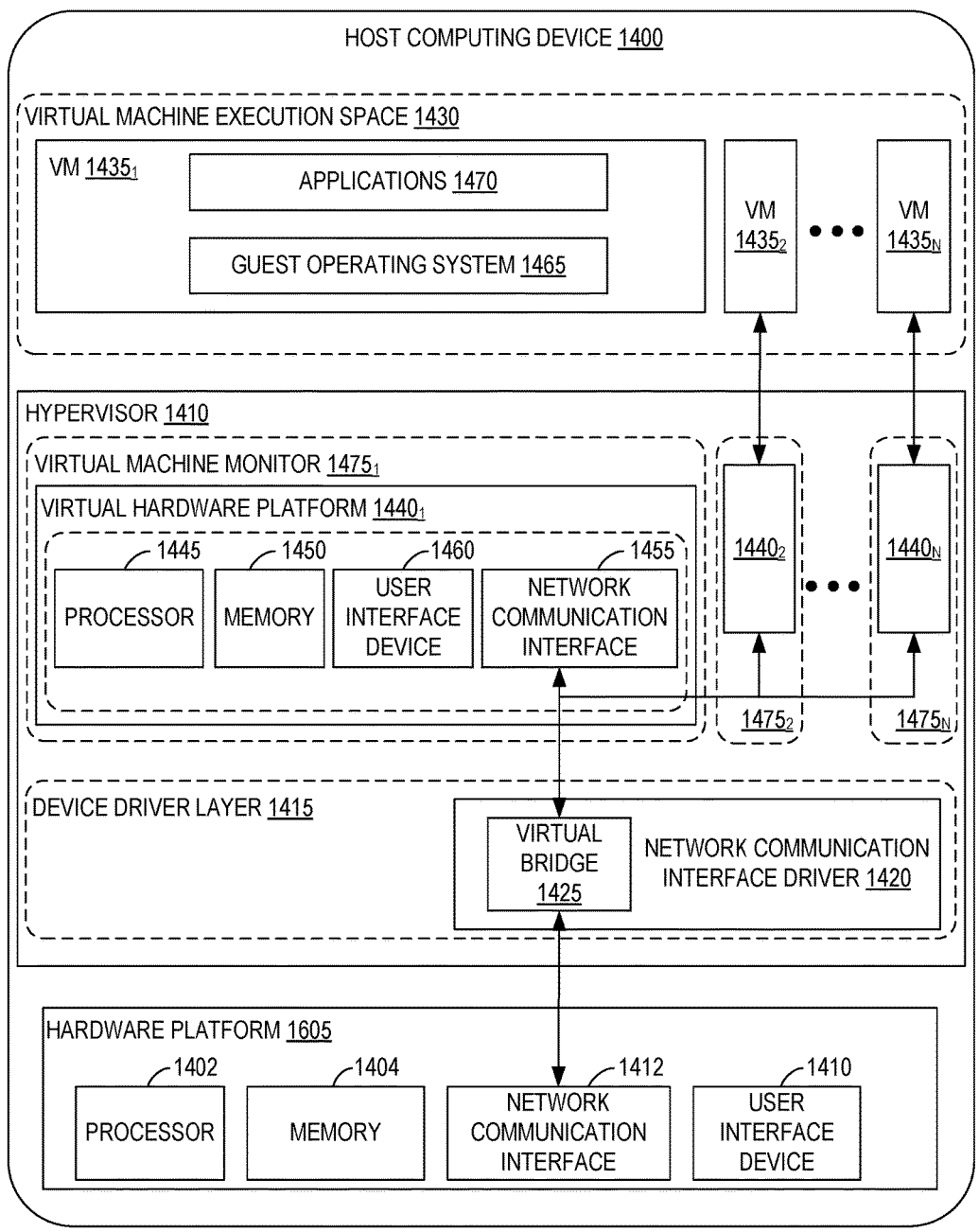
FIG. 14 is a block diagram of VMs that are instantiated on host computing device.

FIG. 14 depicts a block diagram of VMs 1435$_1$, 1435$_2$ ... 1435$_N$ that are instantiated on the host computing device 1400. The host computing device 1400 includes a hardware platform 1405, such as an x86 architecture platform. The hardware platform 1405 may include processor 1402, memory 1404, network communication interface 1412, the user interface device 1410, and other input/output (I/O) devices, such as a presentation device 1406. A virtualization software layer is installed on top of hardware platform 1405. The virtualization software layer in this example includes a hypervisor 1410, The virtualization software layer supports a VM execution space 1430 within which multiple VMs (VMs 1435$_1$-1435$_N$) may be concurrently instantiated and executed. The hypervisor 1410 includes a device driver layer 1415, and maps physical resources of the hardware platform 1405 (e.g., processor 1402, memory 1404, network communication interface 1412, and/or user interface device 1410) to "virtual" resources of each of VMs 1435$_1$-1435$_N$ such that each of VMs 1435$_1$-1435$_N$ has its own virtual hardware platform (e.g., a corresponding one of virtual hardware platforms 1440$_1$-1440$_N$), each virtual hardware platform having its own emulated hardware (such as a processor 1445, a memory 1450, a network communication interface 1455, a user interface device 1460 and other emulated I/O devices in VM 1435$_1$). The hypervisor 1410 may manage (e.g., monitor, initiate, and/or terminate) execution of VMs 1435$_1$-1435$_N$ according to policies associated with the hypervisor 1410, such as a policy specifying that VMs 1435$_1$-1435$_N$ are to be automatically respawned upon unexpected termination and/or upon initialization of the hypervisor 1410. In addition, or alternatively, the hypervisor 1410 may manage execution VMs 1435$_1$-1435$_N$ based on requests received from a device other than host computing device 1401. For example, the hypervisor 1410 may receive an execution instruction specifying the initiation of execution of the first VM 1435$_1$ from a management device via the network communication interface 1412 and execute the execution instruction to initiate execution of first VM 1435$_1$.

In some examples, the memory 1450 in first virtual hardware platform 1440$_1$ includes a virtual disk that is associated with or "mapped to" one or more virtual disk images stored on a disk (e.g., a hard disk or solid state disk) of the host computing device 1400. The virtual disk image represents a file system (e.g., a hierarchy of directories and files) used by first VM 1435$_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

The device driver layer 1415 includes, for example, a communication interface driver 1720 that interacts with the network communication interface 1412 to receive and transmit data from, for example, a local area network (LAN) connected to the host computing device 1400. The communication interface driver 1420 also includes a virtual bridge 1425 that simulates the broadcasting of data packets in a physical network received from one communication interface (e.g., network communication interface 1412) to other communication interfaces (e.g., the virtual communication interfaces of VMs 1435$_1$-1435$_N$). Each virtual communication interface for each VM 1435$_1$-1435$_N$, such as network communication interface 1455 for the first VM 1435$_1$, may be assigned a unique virtual Media Access Control (MAC) address that enables virtual bridge 1425 to simulate the forwarding of incoming data packets from the network communication interface 1412. In an example, the network communication interface 1412 is an Ethernet adapter that is configured in "promiscuous mode" such that all Ethernet packets that it receives (rather than just Ethernet packets addressed to its own physical MAC address) are passed to virtual bridge 1425, which, in turn, is able to further forward the Ethernet packets to VMs 1435$_1$-1435$_N$. This configuration enables an Ethernet packet that has a virtual MAC address as its destination address to properly reach the VM in the host computing device 1400 with a virtual communication interface that corresponds to such virtual MAC address.

The virtual hardware platform $1440_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 1465 in order to execute applications 1470 for an instantiated VM, such as first VM $1435_1$. The virtual hardware platforms $1440_1$-$1440_N$ may be considered to be part of VM monitors (VMM) $1475_1$-$1475_N$ that implement the virtual system support to coordinate operations between the hypervisor 1410 and corresponding VMs $1435_1$-$1435_N$. Those with ordinary skill in the art will recognize that the various terms, layers, and categorizations used to describe the virtualization components in FIG. 14 may be referred to differently without departing from their functionality or the spirit or scope of the disclosure. For example, the virtual hardware platforms $1440_1$-$1440_N$ may also be considered to be separate from VMMs $1475_1$-$1475_N$, and VMMs $1475_1$-$1475_N$ may be considered to be separate from the hypervisor 1410. One example of the hypervisor 1410 that may be used in an example of the disclosure is included as a component in VMware's ESX brand software, which is commercially available from VMware, Inc.

Certain examples described herein involve a hardware abstraction layer on top of a host computer (e.g., server). The hardware abstraction layer allows multiple containers to share the hardware resource. These containers, isolated from each other, have at least a user application running therein. The hardware abstraction layer thus provides benefits of resource isolation and allocation among the containers. In the foregoing examples, VMs are used as an example for the containers and hypervisors as an example for the hardware abstraction layer. Each VM generally includes a guest operating system in which at least one application runs. It should be noted that these examples may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices. In some examples, the computing system environment includes a first computer system at a first site and/or a second computer system at a second site. The first computer system at the first site in some non-limiting examples executes program code, such as computer readable instructions stored on non-transitory computer readable storage medium.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for generating a page-fault translation table. For example, the elements illustrated in FIG. 1, FIG. 2, FIG. 3, and FIG. 5 such as when encoded to perform the operations illustrated in FIG. 6, FIG. 7, FIG. 8, FIG. 9, FIG. 10, FIG. 11, and FIG. 12, constitute exemplary means for decreasing a memory limit associated with at least one VM by a pre-determined memory size increment to reduce an amount of memory available to the at least one VM, exemplary means for obtaining the page-fault latency associated with the at least one page-fault, exemplary means for calculating a performance score associated with the at least one VM based on the page-fault latency; and exemplary means for creating an entry in a page-fault translation table associated with the at least one VM, the entry comprising the page-fault latency and the performance score.

The examples illustrated and described herein as well as examples not specifically described herein but within the scope of aspects of the disclosure constitute exemplary means for determining performance of a workload based on page-fault latency. For example, the elements illustrated in FIG. 1, FIG. 2 and FIG. 3, such as when encoded to perform the operations illustrated in FIG. 6, FIG. 7, FIG. 8, FIG. 9, FIG. 10, FIG. 11 and FIG. 12, constitute exemplary means for obtaining a current page-fault latency for a workload, exemplary means for retrieving a page-fault translation table for the workload, exemplary means for translating the page-fault latency to a performance score based on the page-fault translation table; and exemplary means for determining a workload performance loss based on the performance score.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A method for determining performance of virtual machines (VMs), executing on a plurality of hosts in a cluster, based on page-fault latency, said method comprising:

decreasing a memory limit associated with at least one VM, executing on one of the plurality of hosts, by a pre-determined memory size increment to reduce memory available to the at least one VM, the decreased memory limit inducing at least one page-fault;

obtaining the page-fault latency associated with the at least one page-fault, by a hypervisor;

calculating a performance score associated to the page-fault latency associated with the at least one VM; and creating an entry in a page-fault translation table associated with the at least one VM, the entry comprising the page-fault latency and the performance score corresponding to the page-fault latency.

2. The method of claim 1, wherein the page-fault translation table maps the page-fault latency to the performance score.

3. The method of claim 1, wherein the page-fault latency obtained by the hypervisor is associated with a workload that spans two or more of the VMs.

4. The method of claim 1, further comprising:

receiving a current page-fault latency feedback for a workload running on a VM host;

retrieving a workload-specific page-fault translation table for the workload;

translating the current page-fault latency to a performance score based on at least one entry in the page-fault translation table; and determining a current performance of the workload based on the performance score.

5. The method of claim 1, further comprising:

receiving a current performance score for at least one workload running on a VM in a set of VMs executing on a first VM host in a cluster;

retrieving a workload-specific performance threshold associated with the at least one workload;

on determining the performance score is above the workload-specific performance threshold, permitting the VM to continue running on the first VM host; and on determining the performance score is below the threshold, selecting at least one VM running on the first VM host and migrating the at least one VM to a second VM host in the cluster.

6. The method of claim 1, further comprising:

obtaining a performance score for at least one VM running on a first VM host in a plurality of VM hosts in a cluster;

retrieving an aggregate threshold;

on determining that the performance score is above the aggregate threshold, permitting the at least one VM to continue running on the first VM host; and on determining the performance score is below the aggregate threshold, selecting a second VM host of the plurality of VM hosts and migrating the at least one VM to the second VM host in the cluster.

7. The method of claim 1, further comprising:

obtaining a current performance score associated with at least one workload running on the at least one VM;

calculating a performance loss based on the performance score; and comparing the performance loss to a performance threshold to determine if current performance of the at least one VM is above a lower performance limit; and on determining the performance is below the lower performance limit, rebalancing at least one VM host associated with the at least one VM.

8. A system for evaluating performance of a virtual machine (VM) host, said system comprising:

a memory storing a plurality of page-fault translation tables corresponding to a plurality of VMs executing on a plurality of VM hosts in a cluster;
at least one processor; and
a hypervisor, the at least one processor programmed to:
   receive a page-fault latency for a workload in a plurality of workloads, the workload associated with a VM executing on a VM host in the cluster, the page-fault latency being induced by decreasing a memory limit associated with the VM by a pre-determined memory size;
   identify a page-fault translation table from the plurality of page-fault translation tables corresponding to the workload;
   map the page-fault latency to a performance score of the workload based on at least one entry in the page-fault translation table, by the hypervisor; and
   determine a performance loss of the workload based on the mapping of the page-fault latency to the performance score in the page-fault translation table.

9. The system of claim 8, wherein the memory further stores a set of thresholds, and wherein the at least one processor is further programmed to:
   retrieve a workload-specific threshold from the set of thresholds;
   compare the performance score to the workload-specific threshold;
   on determining that the performance score is above the workload-specific threshold, permit the VM to continue executing on the VM host.

10. The system of claim 8, wherein the VM host is a first VM host in the cluster, wherein the memory further stores a set of thresholds, and wherein the at least one processor is further programmed to:
   retrieve a workload-specific threshold from the set of thresholds;
   compare the performance score to the workload-specific threshold;
   on determining that the performance score is below the workload-specific threshold, select a VM running on the first VM host and migrate the selected VM to a second VM host in the cluster.

11. The system of claim 8, wherein the at least one processor is further programmed to:
   retrieve a second page-fault translation table for a second workload on determining that a first page-fault translation table for a first workload is unavailable, the second workload is a different workload than the first workload, and wherein the second workload is similar to the first workload; and
   map the page-fault latency to a performance score in the second page-fault translation table and determine the performance loss for the workload based on the page-fault latency mapped to the performance score.

12. The system of claim 8, wherein the at least one processor further programmed to:
   compute an aggregate performance loss for the VM based on a performance loss for each workload in a plurality of workloads running on the VM.

13. The system of claim 8, wherein the at least one processor further programmed to:
   compute an aggregate performance loss for a given VM host based on a performance loss for each VM in a set of VMs running on the given VM host.

14. The system of claim 8, wherein the VM host is a first VM host in the cluster, and wherein the at least one processor is further programmed to:
   compare an aggregate performance loss for a plurality of workloads running on at least one VM to an aggregate threshold; and
   on determining that the aggregate performance loss is below the aggregate threshold, migrate at least one VM from a first VM host to a second VM host.

15. One or more non-transitory computer storage media embodying computer executable components that, when executed, cause at least one processor to:
   induce a plurality of page-faults by varying a memory limit of a workload by a pre-determined memory size increment;
   measure a plurality of page-fault latencies experienced by the workload at each memory limit in the plurality of varying memory limits;
   assign a performance score to each page-fault latency in the plurality of page-fault latencies to form a plurality of value pairs, a value pair comprising a page-fault latency and a corresponding performance score; and
   construct a page-fault translation table for the workload, the page-fault translation table comprising the plurality of value pairs.

16. The non-transitory computer storage media of claim 15, wherein the at least one processor is further caused to:
   measure a performance loss at each page-fault latency in the plurality of page-fault latencies; and
   convert the performance loss associated with each page-fault latency to the performance score assigned to each page-fault latency.

17. The non-transitory computer storage media of claim 15, wherein the at least one processor is further caused to:
   on receiving a current page-fault latency for the workload, retrieve a page-fault translation table associated with the workload; and
   translate the current page-fault latency to performance score of the workload based on the page-fault translation table.

18. The non-transitory computer storage media of claim 15, wherein the at least one processor is further caused to:
   on receiving a current page-fault latency for the workload, retrieve a performance score assigned to the current page-fault latency from the page-fault translation table associated with the workload; and
   determine a current performance loss for the workload based on the performance score.

19. The non-transitory computer storage media of claim 15, wherein the at least one processor is further caused to:
   determine a performance loss for a given workload running on the VM; and
   compare the performance loss to an aggregate threshold to determine whether current performance of the given workload is above a lower performance limit.

20. The non-transitory computer storage media of claim 15, wherein the at least one processor is further caused to:
   determine an aggregate performance loss for a plurality of workloads running on a VM host; and
   compare the aggregate performance loss to an aggregate threshold to determine whether current performance of the plurality of workloads is above a lower performance limit.

* * * * *